United States Patent
Quesada

[19]

[11] Patent Number: 5,815,369
[45] Date of Patent: Sep. 29, 1998

[54] COMPUTER PC TRAY TO MONITOR ASSEMBLY CONNECTION APPARATUS AND ASSOCIATED METHODS

[75] Inventor: Gilbert L. Quesada, The Woodlands, Tex.

[73] Assignee: Compaq Computer Corporation, Houston, Tex.

[21] Appl. No.: 800,650

[22] Filed: Feb. 4, 1997

[51] Int. Cl.[6] .............................. G06F 1/16; H05K 7/10; H01H 9/00

[52] U.S. Cl. .......................... 361/686; 361/682; 361/727; 200/292

[58] Field of Search ...................... 364/708.1; 312/223.2, 312/7.2; 200/292, 341, 345; 361/679, 681–683, 686, 725–727

[56] References Cited

U.S. PATENT DOCUMENTS

| | | | |
|---|---|---|---|
| 4,388,671 | 6/1983 | Hall et al. ................................ | 361/682 |
| 4,480,163 | 10/1984 | Morris et al. ......................... | 200/345 X |
| 5,247,428 | 9/1993 | Yu ........................................ | 361/682 X |
| 5,396,400 | 3/1995 | Register et al. ........................ | 361/686 |
| 5,621,611 | 4/1997 | Kizuya et al. ....................... | 361/682 X |

*Primary Examiner*—Michael W. Phillips
*Attorney, Agent, or Firm*—Konneker & Smith, P.C.

[57] ABSTRACT

A monitor and a slide-in PC tray are operatively disposed in a common housing in an all-in-one type personal computer. User operable control buttons are mounted on the front side wall of the housing, and the PC tray forwardly slides into the housing, toward the rear ends of the control buttons, through an opening in the rear side wall of the housing. A circuit board is supported within the housing inwardly adjacent the front wall, with depressible switches mounted on the unit being in an aligned, facing relationship with the inner ends of the control buttons. As the PC tray is slid forwardly into the housing, cooperating alignment structures on the tray and the housing facilitate the automatic mating of a pair of facing electrical connectors on the tray and the rear side of the circuit board to thereby electrically couple the switches to the electronic apparatus on the PC tray. Each control button, when pressed, activates its facing circuit board switch and thus the related circuitry on the PC tray. Because of this connection structure, alignment problems between the control buttons and the inserted PC tray structure are essentially eliminated.

19 Claims, 3 Drawing Sheets

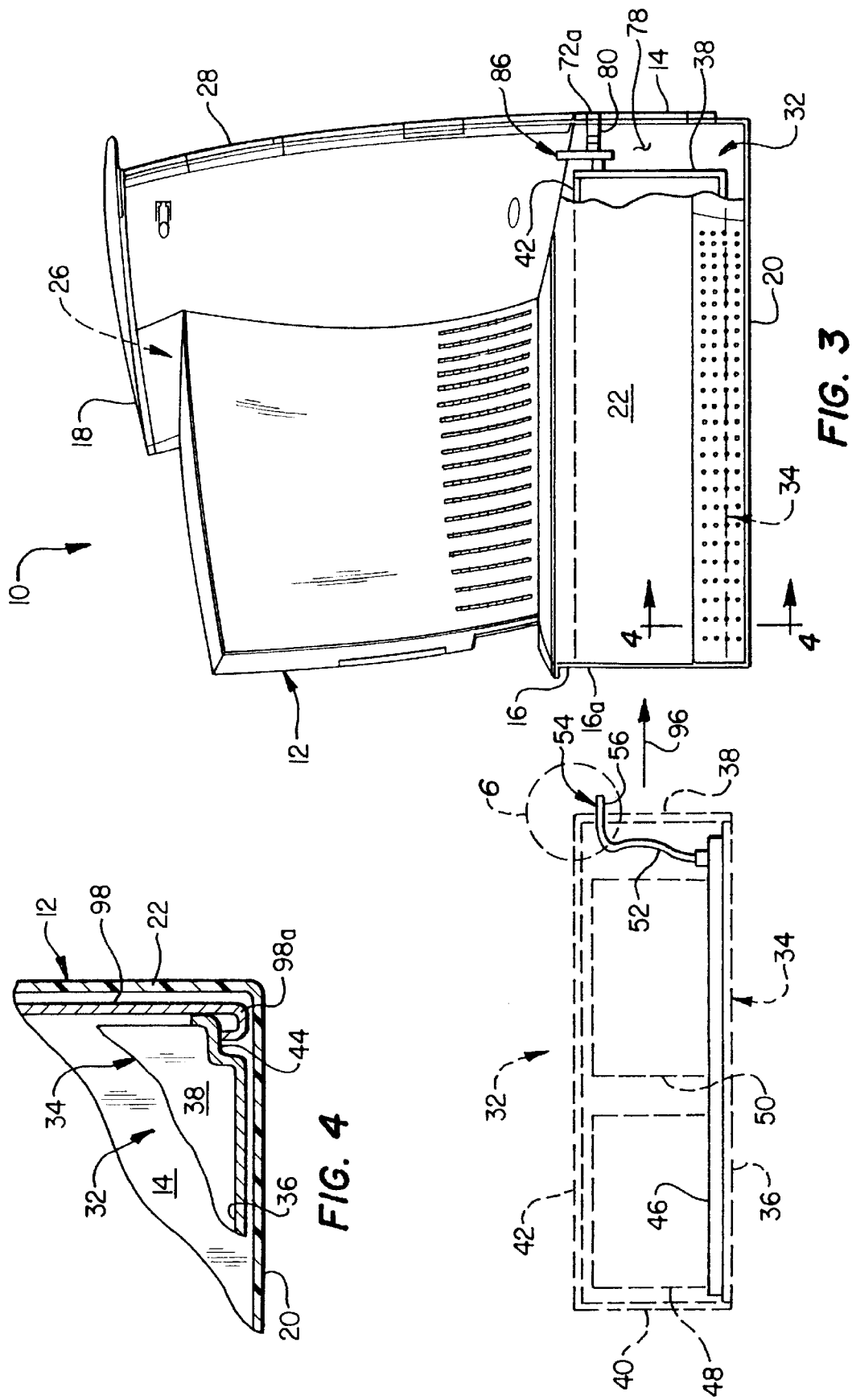

COMPUTER PC TRAY TO MONITOR ASSEMBLY CONNECTION APPARATUS AND ASSOCIATED METHODS

BACKGROUND OF THE INVENTION

1. Field of the Invention

The present invention generally relates to electronic apparatus and, in a preferred embodiment thereof, more particularly relates to apparatus and methods for operatively connecting the electronics in a slide-in PC tray to the monitor housing control buttons in an all-in-one type computer.

2. Description of Related Art

As is well known, personal computers come in a wide variety of physical shapes and configurations ranging from the diminutive subnotebook computer which compactly packages a keyboard, operating electronics and a monitor in a single portable package, to considerably larger multi-component desktop computers which may include separate computer, monitor, keyboard and speaker components together with other separate computing accessories. Generally occupying a middle ground between these two computer system extremes is a personal computer structure commonly referred to as an "all-in-one" desktop computer.

In this type of computer, although a separate keyboard is required, the monitor and computer proper (and often speakers as well) are conveniently mounted in a single housing structure. For ease of assembly, inspection, maintenance and upgrading, the actual computer components such as the motherboard, option cards, disc drives, CD-ROM drives and the like are typically mounted in a slide-in PC tray structure which may be inserted into the common computer/monitor housing through a suitably sized lower rear side opening that faces operating and control buttons on the front bezel portion of the housing. The purpose of these buttons is to permit a user of the computer to send appropriate operating and control signals to the computer apparatus in the PC tray by depressing appropriate ones of the buttons.

In early forms of this type of personal computer, the interconnection between the operating/control buttons and the computer apparatus on the slide-in tray was effected by means of one or more flexible ribbon cables routed between and electrically coupled to the buttons and the PC tray circuitry. While on its face this appeared to be a simple and straightforward approach to this interconnection task, it carried with it several problems, limitations and disadvantages.

For example, the actual connection of the ribbon cable to the PC tray circuitry and the individual operating/control buttons tended to be a tedious, time consuming task. Additionally, in each ribbon cable, a service loop had to be provided to permit the installed PC tray to be removed from the computer housing as necessary for inspection, service and upgrading as the case may be. Each time the PC tray was inserted into the housing, the ribbon cable service loop(s) had to be carefully tucked out of the way of the tray and adjacent components within the housing to avoid damage to the ribbon cable(s) during both insertion of the tray and subsequent removal thereof from the housing. As might be imagined, this tended to be an awkward task at best.

A proposed solution to this control button/PC tray circuitry interconnection problem was to eliminate the use of ribbon cable hard wiring of the buttons to the tray circuitry and replace it with switch circuitry mounted on the tray for movement therewith into and out of the housing. Specifically, a circuit board referred to as a "button board" was mounted on the front end of the tray, with a spaced series of depressible switch members being mounted on a front side of the board and electrically coupled to the tray circuitry.

The object of this control button/tray circuitry interconnection approach was to position the circuit board switches on the tray front in a manner such that when the PC tray was operatively inserted into the computer housing, the depressible switches carried by the tray would be brought into inwardly spaced alignment with the control button array so that when any of the control buttons was depressed, it would engage and activate an associated one of the switches to thereby send a selected control signal to the PC tray circuitry.

While this control button/PC tray circuitry interconnection technique eliminated the problems associated with the use of ribbon cables, it presented a problem of its own which was just as troublesome if not more so. Specifically, substantial control button/switch misalignment problems were encountered such that in some instances a depressed control button would not even contact its associated button board switch.

In view of the foregoing it can readily be seen that a need exists for a improved apparatus and methods for operatively associating movable operating/control members on an electronic apparatus housing with electrical circuitry insertable into the housing which eliminate or at least substantially reduce the above-mentioned problems, limitations and disadvantages associated with conventional interconnection apparatus and methods. It is accordingly an object of the present invention to provide such improved apparatus and methods.

SUMMARY OF THE INVENTION

In carrying out principles of the present invention, in accordance with a preferred embodiment thereof, electronic apparatus is provided that comprises a housing having an exterior wall with inner and outer sides, an opening spaced apart from and facing the inner side of the exterior wall and an interior space extending between the opening and the inner side of the exterior housing wall. Representatively, the electronic apparatus is an all-in-one type computer in which a monitor structure is mounted within an upper portion of the housing.

A spaced plurality of user operable control members, representatively push button structures, are movably carried on the exterior housing wall, and a circuit board is supported inwardly adjacent the wall. The circuit board has a spaced plurality of depressible switch structures mounted thereon in alignment with the spaced plurality of control members and being operatively engageable by the control members in response to movement thereof. A first connector is carried on the circuit board and electrically coupled to the switch structures.

A support structure, representatively having a tray configuration, is movable into and out of the housing interior through the aforementioned housing opening and has a second connector thereon which is mateable with the first connector. The support structure has electrical circuitry disposed thereon and coupled to the second connector.

As the support structure is inserted into the housing structure toward the push buttons, cooperatively engageable portions on the support structure and the housing maintain the first and second connectors in a predetermined aligned relationship as the support structure moves into the housing interior so that as the support structure approaches the circuit board the first and second connectors mate to thereby operatively couple the switch structures to the electrical circuitry on the support structure in a manner permitting the electrical circuitry to be controlled by user movement of the housing mounted push buttons.

The use of the circuit board supported inwardly adjacent the push buttons and having the first connector thereon, the second connector carried on the support structure, and the cooperatively engageable alignment portions on the support structure and the housing advantageously provide automatic coupling of the push buttons with the electrical circuitry on the support structure in response to insertion of the support structure into the housing without (1) the installation and handling problems associated with the use of one or more flexible cables directly interconnected between the push buttons and the electrical circuitry, or (2) the alignment inaccuracy problems previously associated with mounting the switch-carrying circuit board on the support structure for movement therewith into place behind the housing wall push buttons.

BRIEF DESCRIPTION OF THE DRAWINGS

FIG. 3 is a simplified, partially cut away left side elevational view of the computer, with a slide-in PC tray portion of the computer additionally being schematically illustrated in phantom and removed from the computer housing;

FIG. 4 is an enlarged scale simplified partial cross-sectional view through the computer taken generally along line 4—4 of FIG. 3;

DETAILED DESCRIPTION

Figure 1:
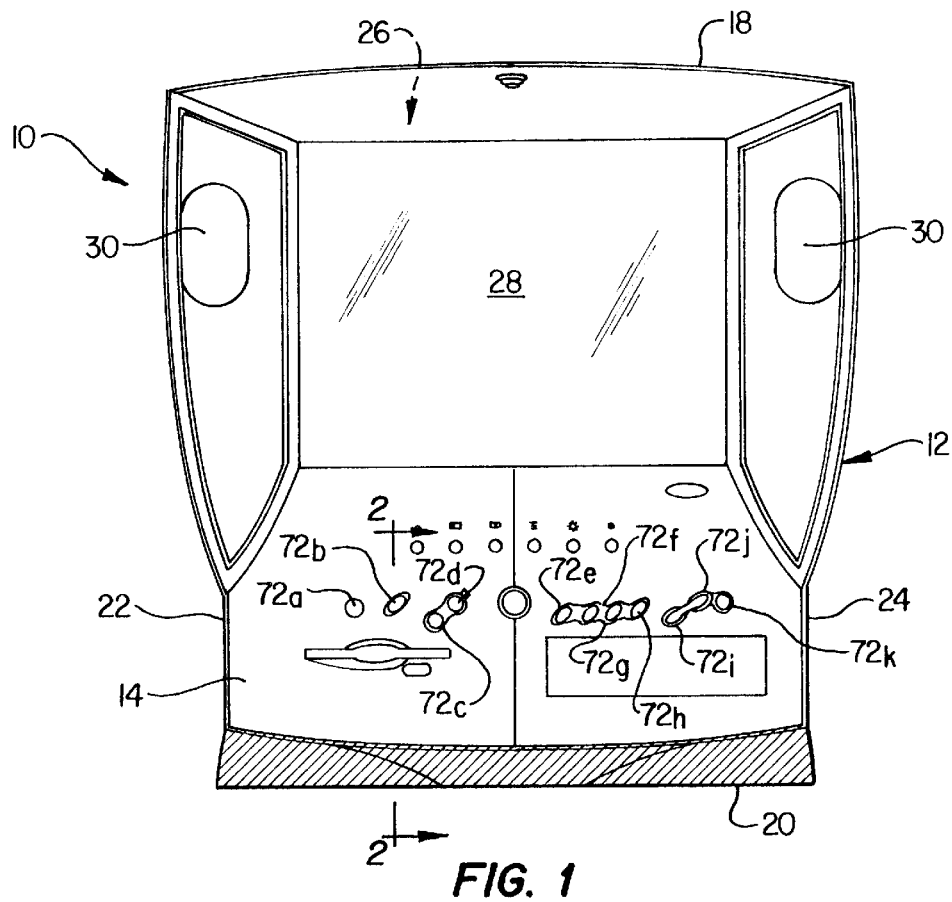
FIG. 1 is a simplified front elevational view of a computer embodying principles of the present invention.

Referring initially to FIGS. 1 and 3, the present invention provides electronic apparatus which is representatively in the form of a specially designed "all-in-one" type of computer 10. Computer 10 includes a plastic outer housing 12 having a front wall 14, a rear wall 16 having a rectangular opening 16a therein, top and bottom walls 18 and 20, and left and right side walls 22 and 24. Disposed in the housing 12 are a monitor structure 26 occupying an upper interior portion of the housing 12 and having a display screen 28 mounted on the front side of the housing above the front wall 14 and between a pair of speakers 30; and a slide-in computer assembly 32 disposed in a lower portion of the housing 12 behind the front wall 14 and beneath the monitor structure 26.

Turning now to FIGS. 1, 3, 4, 6 and 7, the slide-in computer assembly 32, also commonly referred to as a PC tray, includes a generally rectangular sheet metal tray structure 34 having a horizontal bottom wall 36, upstanding front and rear end walls 38 and 40, and a reinforcing bar 42 extending between top side edge portions of the front and rear end walls 38 and 40. For purposes later described herein, opposite left and right side edge portions of the bottom wall 36 are upwardly deformed to form in the tray structure 34 opposite bottom side corner indentations 44(see FIG. 4) which are elongated in front-to-rear directions.

Figure 6:
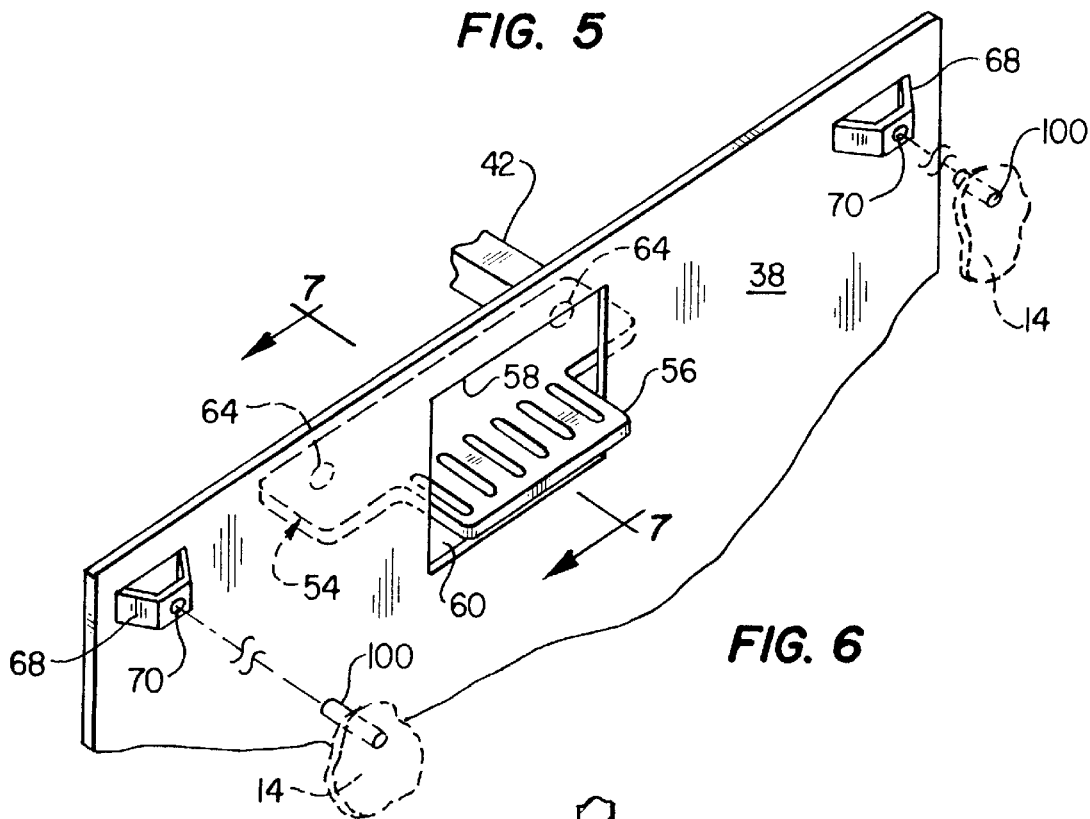
FIG. 6 is a simplified perspective view of the portion of the PC tray shown in the dashed circle area "6" in FIG. 3.
Figure 7:
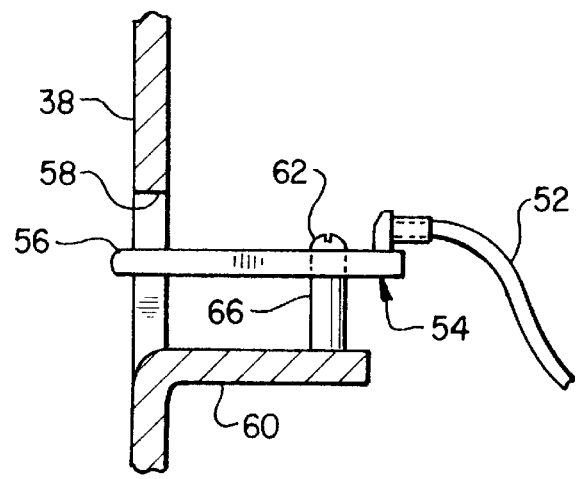
FIG. 7 is an enlarged scale simplified cross-sectional view through the PC tray taken generally along line 7—7 of FIG. 6.

Various computer components and associated interconnected electrical circuit apparatus are carried on the bottom tray wall 36 (see FIG. 3), and representatively include a motherboard 46, a power supply unit 48, and a CD-ROM drive unit 50. The electrical circuit apparatus, representatively via the motherboard 46, is coupled by a flexible ribbon cable 52 to a connector structure in the form of an interface circuit board 54 carried on the front wall 38 of the tray structure 34. As best illustrated in FIGS. 6 and 7, the interface circuit board 54 has a connector edge portion 56 that extends forwardly through a rectangular opening 58 formed in the front tray wall 38 by bending a tab portion 60 thereof rearwardly into the interior of the tray structure.

Interface circuit board 54 is horizontally mounted on the tab 60 in an upwardly spaced relationship therewith by means of mounting screws 62 extended downwardly through circular mounting holes 64 in the circuit board 54 and threaded into upwardly projecting tubular mounting studs 66 pressed into corresponding holes in the tab 60. For purposes later described herein, a pair of forwardly projecting lances 68 are formed in top corner portions of the front tray wall 38 (see FIG. 6) and have circular holes 70 formed in front side portions thereof.

Figure 2:
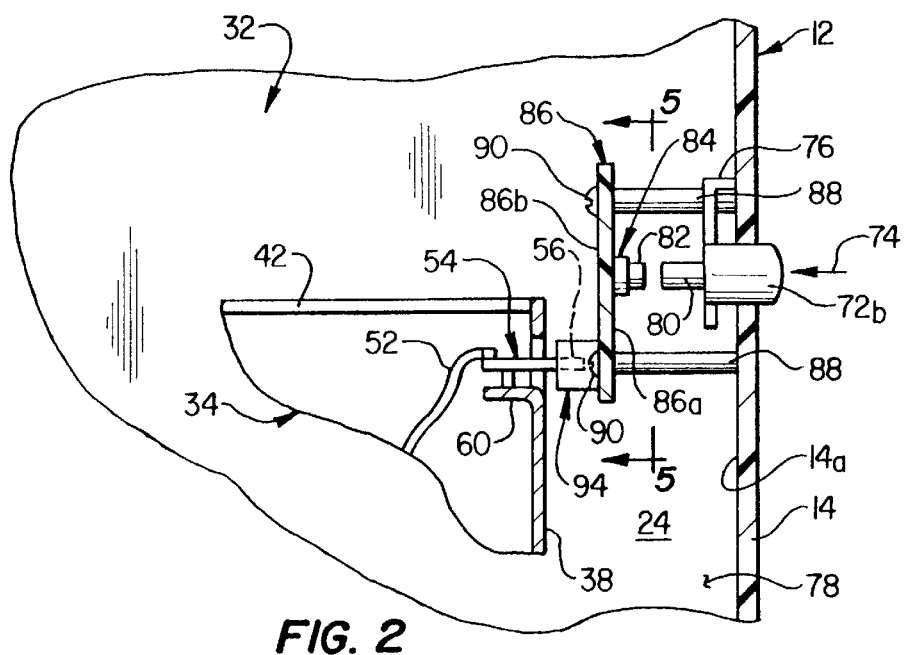
FIG. 2 is an enlarged scale schematic partial cross-sectional view through the computer taken generally along line 2—2 of FIG. 1.

With reference now to FIGS. 1–3, a horizontally spaced series of user operable control members, representatively in the form of push buttons 72a–72k, are mounted on the front housing wall 14. Push buttons 72a–72k are rearwardly movable (as indicated by the arrow 74 in FIG. 2) relative to wall 14 against the resilient force of plastic spring plate members 76 intersecured between the push buttons 72a–72k and the inner side 14a of the front housing wall 14.

Figure 5:
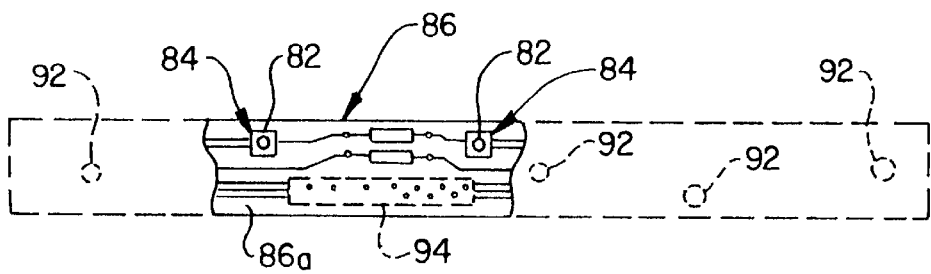
FIG. 5 is a reduced scale, partially phantomed front side elevational view of a button board portion of the computer taken generally along line 5—5 of FIG. 2.

As best illustrated in FIGS. 2 and 5, each push button 72a–72k has, within the interior 78 of the housing 12, a rearwardly projecting plunger portion 80. Plungers 80 are forwardly spaced apart from and aligned with a spaced series of depressible button portions 82 of electrical switch structures 84 mounted on the front side 86a of a horizontally elongated circuit board 86.

Circuit board 86 is supported within the housing interior 78, with the front circuit board side 86a being in a facing, inwardly spaced relationship with the inner side 14a of the front housing wall 14, by a series of boss members 88 extending inwardly from the front housing wall 14 and secured to the circuit board 86 by mounting screws 90 extended through circular holes 92 in the circuit board 86 into the inner ends of the bosses 88. Switch structures 84 are electrically coupled to a socket type electrical connector 94 (see FIG. 2) projecting rearwardly from the back side 86b of the circuit board 86.

Referring now to FIGS. 2–4, the tray structure 34 (shown in phantom in FIG. 3 removed from the housing 12) is forwardly insertable into the interior 78 of the housing 12, through the rear housing wall opening 16a, as indicated by the arrow 96 in FIG. 3, to position the inserted computer assembly 32 beneath the monitor structure 26 and operatively mate the two connectors 54 and 94. With the computer assembly 32 inserted into the housing 12 in this manner, and the connectors 54,94 mated, a user of the computer 10 may send appropriate operating and control signals to the electrical circuitry on the inserted tray structure 34 by simply pushing selected ones of the control buttons 72a–72k. When any of these buttons is pushed, its plunger 80 operatively engages its associated switch 84 to sent the selected signal to the tray circuitry via the mated connectors 54,94 and the ribbon cable 52 within the interior of the tray structure 34.

Cooperatively engageable portions on the tray structure 34 and the housing 12 are utilized to facilitate the automatic mating of the connectors 54,94 in response to forward insertion of the computer assembly 32 through the rear housing wall opening 16a and into the housing interior 78 beneath the monitor structure 26. These cooperatively engageable portions include the previously described bottom tray corner indentations 44 (see FIG. 4) and upturned lower edge portions 98a of vertical sheet metal chassis side walls 98 (only one of which is shown in FIG. 4) vertically extending within the housing interior inwardly adjacent the housing side walls 22 and 24.

As illustrated in FIG. 4, these upturned chassis wall edge portions 98a are slidingly received in the tray indentations 44 to vertically and horizontally align the connectors 54,94 as the inserted computer assembly or PC tray 32 approaches the circuit board 86. As this occurs, the connector edge portion 56 of the interface circuit board 54 (see FIG. 6) matingly enters the interior of the socket connector 94 as shown in schematic form in FIG. 2. Further facilitating this socket alignment function are a pair of bosses 100 (see FIG. 6) that project inwardly from the front housing wall 14 and enter the lance holes 70 as the front tray wall 38 approaches the front housing wall 14.

The use of the circuit board 86 supported inwardly adjacent the push buttons 72a–72k and having the connector 94 thereon, the mating connector structure 54 carried on the front side of the tray structure 34, and the cooperatively engageable alignment structures on the tray 32 and the housing 12 advantageously provide automatic coupling of the push buttons 72a–72k with the electrical circuitry in the computer assembly 32 in response to insertion of the assembly 32 into the housing 12 without (1) the installation and handling problems associated with the use of one or more flexible cables directly interconnected between the push buttons and the PC tray, or (2) the alignment inaccuracy problems previously associated with mounting the circuit board 86 on the front of the tray structure 34 for movement therewith into place behind the front housing wall push buttons.

The foregoing detailed description is to be clearly understood as being given by way of illustration and example only, the spirit and scope of the present invention being limited solely by the appended claims.

What is claimed is:

1. Electronic apparatus comprising:
   a wall member having first and second sides;
   a control member movably carried on said wall member and being manually operable from said first side thereof;
   a circuit structure supported adjacent said second side and including a switch structure operatively engageable by said control member in response to movement thereof, and a first connector electrically coupled to said switch structure; and
   a support structure adapted to carry an electrical device, said support structure having a second connector carried thereon and being connectable to the electrical device, said support structure being movable toward said second side of said wall member in a manner operatively coupling said first and second connectors.

2. The electronic apparatus of claim 1 wherein said wall member is a portion of a computer housing.

3. The electronic apparatus of claim 1 wherein said support structure is a PC tray.

4. The electronic apparatus of claim 3 further comprising an electrical device supported on said PC tray and operatively coupled to said second connector.

5. Electronic apparatus comprising:
   a housing having a wall with inner and outer sides;
   a user operable control member movably carried on said wall;
   a circuit structure supported inwardly adjacent said wall and including a switch structure operatively engageable by said control member in response to movement thereof, and a first connector electrically coupled to said switch structure; and
   an electronic assembly including support apparatus to which a second connector is secured, and electrical circuitry carried by said support apparatus and coupled to said second connector, said support apparatus being insertable into said housing in a manner mating said first and second connectors and thereby coupling said switch to said electrical circuitry.

6. The electronic apparatus of claim 5 wherein:
   said support apparatus is inserted in said housing, and
   said first and second connectors are operatively mated.

7. The electronic apparatus of claim 5 further comprising:
   cooperatively engageable portions on said support apparatus and said housing for matingly aligning said second connector with said first connector as said support apparatus is being inserted into said housing.

8. The electronic apparatus of claim 7 wherein:
   said support apparatus is a tray structure having opposite corner sections, and
   said cooperatively engageable portions include elongated indentations formed in said corner sections, and upturned interior wall portions of said housing slidably receivable in said indentations.

9. The electronic apparatus of claim 5 wherein said electronic apparatus is a computer.

10. The electronic apparatus of claim 9 wherein said housing has a monitor structure disposed therein.

11. The electronic apparatus of claim 10 wherein said support apparatus is a PC tray.

12. A computer comprising:
   a housing having an exterior wall with inner and outer sides, an opening spaced apart from and facing said inner side of said exterior wall and an interior space extending between said opening and said inner side of said exterior wall;
   a display monitor mounted in said housing;
   a spaced plurality of user operable control members movably carried on said exterior wall;
   a circuit board supported inwardly adjacent said inner side of said exterior wall, said circuit board having a spaced plurality of depressible switch structures mounted thereon in alignment with said spaced plurality of control members and being operatively engageable by said control members in response to movement thereof, and a first connector electrically coupled to said switch structures;
   a PC tray movable into and out of said interior space through said opening, said PC tray having a second connector carried thereon and mateable with said first connector;
   electrical circuitry carried by said PC tray and coupled to said second connector; and cooperatively engageable portions on said PC tray and said housing for maintaining said first and second connectors in a predetermined aligned relationship as said PC tray moves into said interior space so that as said PC tray approaches said circuit board said first and second connectors mate to thereby operatively couple said switch structures to said electrical circuitry in a manner permitting said electrical circuitry to be controlled by movement of said control members.

13. The computer of claim 12 wherein:

said PC tray is inserted in said housing, and said first and second connectors are operatively mated.

14. The computer of claim 12 wherein:

said first connector is a socket type electrical connector, and said second connector is a circuit board having a body portion insertable into said first connector.

15. The computer of claim 12 wherein:

said control members have inwardly movable plunger portions, and said switch structures have depressible button portions inwardly adjacent and aligned with said plunger portions.

16. The computer of claim 12 wherein:

said PC tray has elongated indentations formed in opposite bottom side corner portions thereof, and said cooperatively engageable portions include said indentations and elongated interior portions of said housing slidably and supportingly receivable in said indentations.

17. For use in electronic apparatus having a housing with an exterior wall with inner and outer sides, and a spaced plurality of user operable control members movably mounted on said exterior wall, a method of operatively coupling electrical circuitry to said control members, said method comprising the steps of:

supporting a circuit structure within said housing inwardly adjacent said control members, said circuit structure having thereon a spaced plurality of switch structures aligned with said control members for operative engagement by said control members in response to movement thereof, and a first connector electrically coupled to said switch structures;

providing a support structure having a second connector thereon;

disposing said electrical circuitry on said support structure;

coupling said electrical circuitry to said second connector; and inserting said support structure into said housing in a manner operatively mating said first and second connectors.

18. The method of claim 17 further comprising the step of:

utilizing cooperatively engaged portions of said support structure and said housing to matingly align said first and second connectors during the performance of said inserting step.

19. The method of claim 18 wherein:

said electronic apparatus is a computer, said housing has a display monitor disposed structure in an upper portion thereof, and said inserting step is performed by inserting said support structure into said housing below said display monitor structure.

* * * * *